United States Patent
Norton et al.

(10) Patent No.: US 10,222,005 B2
(45) Date of Patent: Mar. 5, 2019

(54) METHOD AND ASSEMBLY FOR REPLACING FLUORESCENT LIGHTS

(71) Applicants: Sidney Howard Norton, Odessa, TX (US); Curtis Alan Roys, Fredericksburg, TX (US)

(72) Inventors: Sidney Howard Norton, Odessa, TX (US); Curtis Alan Roys, Fredericksburg, TX (US)

( * ) Notice: Subject to any disclaimer, the term of this patent is extended or adjusted under 35 U.S.C. 154(b) by 0 days.

(21) Appl. No.: 15/219,246

(22) Filed: Jul. 25, 2016

(65) Prior Publication Data

US 2017/0023186 A1 Jan. 26, 2017

Related U.S. Application Data

(62) Division of application No. 29/568,321, filed on Jun. 16, 2016, now Pat. No. Des. 811,627.

(60) Provisional application No. 62/196,732, filed on Jul. 24, 2015, provisional application No. 62/196,813, filed on Jul. 24, 2015.

(51) Int. Cl.
| | | |
|---|---|---|
| *F21V 21/00* | (2006.01) | |
| *F21K 9/27* | (2016.01) | |
| *F21V 23/00* | (2015.01) | |
| *F21Y 115/10* | (2016.01) | |
| *F21V 19/00* | (2006.01) | |
| *F21V 23/06* | (2006.01) | |
| *F21Y 107/30* | (2016.01) | |
| *H01R 33/08* | (2006.01) | |

(52) U.S. Cl.
CPC .............. *F21K 9/27* (2016.08); *F21V 23/003* (2013.01); *F21V 19/008* (2013.01); *F21V 23/06* (2013.01); *F21Y 2107/30* (2016.08); *F21Y 2115/10* (2016.08); *H01R 33/08* (2013.01); *Y02B 20/386* (2013.01)

(58) Field of Classification Search
CPC ........ F21K 9/27; F21V 23/003; F21V 19/008; F21V 23/06; F21Y 2107/30; F21Y 2115/10; H01R 33/08; Y02B 20/386
See application file for complete search history.

(56) References Cited

U.S. PATENT DOCUMENTS

| | | |
|---|---|---|
| 5,688,042 A | 11/1997 | Madadi et al. |
| 6,210,019 B1 | 4/2001 | Weathers |
| D477,093 S | 7/2003 | Moriyama et al. |
| D506,274 S | 6/2005 | Moriyama et al. |
| 7,052,171 B1 | 5/2006 | Lefebvre et al. |
| D584,429 S | 1/2009 | Pei et al. |
| 7,488,086 B2 | 2/2009 | Wu et al. |

(Continued)

FOREIGN PATENT DOCUMENTS

| | | |
|---|---|---|
| CN | 201487639 U | 5/2010 |
| CN | 202901882 U | 4/2013 |

(Continued)

*Primary Examiner* — Anh T Mai
*Assistant Examiner* — Meghan K Ulanday
(74) *Attorney, Agent, or Firm* — Scheinberg & Associates, P.C.; John B. Kelly

(57) ABSTRACT

End caps that attach to any standard tubing to facilitate mounting a tube with LEDs into an existing fluorescent lamp cabinet. The tube can be cut to a desired length. The end caps can be supported by the fluorescent fixtures or mounting brackets in the cabinet. An assembly comprising a light emitting diode (LED) lamp for replacing fluorescent tube lights.

24 Claims, 21 Drawing Sheets

1300

(56) References Cited

U.S. PATENT DOCUMENTS

| | | | |
|---|---|---|---|
| D594,999 S | 6/2009 | Uchida et al. | |
| D601,726 S | 10/2009 | Mollaert et al. | |
| D610,724 S | 2/2010 | Chiang et al. | |
| 7,926,977 B2* | 4/2011 | Nall | G09F 13/04 362/249.02 |
| 7,976,196 B2 | 7/2011 | Ivey et al. | |
| 8,075,167 B2 | 12/2011 | Shin | |
| 8,232,713 B2 | 7/2012 | Li et al. | |
| 8,328,386 B2 | 12/2012 | Catalano et al. | |
| 8,419,223 B2 | 4/2013 | Withers | |
| 8,434,914 B2 | 5/2013 | Li et al. | |
| 8,474,998 B2 | 7/2013 | Wang et al. | |
| 8,573,813 B2 | 11/2013 | Ivey et al. | |
| 8,636,391 B2 | 1/2014 | Dellian et al. | |
| 9,851,054 B2 | 12/2017 | Vincent | |
| D811,627 S | 2/2018 | Roys | |
| 2004/0056600 A1 | 3/2004 | Lapatovlch et al. | |
| 2004/0062041 A1 | 4/2004 | Cross et al. | |
| 2005/0185396 A1 | 8/2005 | Kutler | |
| 2009/0027916 A1 | 1/2009 | Huang et al. | |
| 2009/0073693 A1 | 3/2009 | Nall et al. | |
| 2009/0091929 A1 | 4/2009 | Faubion | |
| 2010/0008085 A1 | 1/2010 | Ivey et al. | |
| 2010/0102730 A1 | 4/2010 | Simon et al. | |
| 2010/0135020 A1* | 6/2010 | Moore | A47F 11/10 362/249.02 |
| 2011/0019413 A1 | 1/2011 | Zimmerman et al. | |
| 2011/0141729 A1 | 6/2011 | Yang et al. | |
| 2011/0235319 A1 | 9/2011 | Fukano et al. | |
| 2012/0008316 A1 | 1/2012 | Ivey | |
| 2012/0074831 A1 | 3/2012 | Li et al. | |
| 2012/0124874 A1* | 5/2012 | Breihof | G09F 13/04 40/564 |
| 2012/0161666 A1 | 6/2012 | Antony et al. | |
| 2013/0223052 A1 | 8/2013 | Simon et al. | |
| 2014/0153231 A1 | 6/2014 | Bittmann | |
| 2014/0160742 A1* | 6/2014 | Rodgers | F21V 23/02 362/222 |
| 2014/0301069 A1 | 10/2014 | Hwu et al. | |
| 2014/0334142 A1* | 11/2014 | Levante | F21S 4/005 362/222 |
| 2015/0016099 A1 | 1/2015 | Khanarnpompan | |
| 2015/0092413 A1 | 4/2015 | Li et al. | |
| 2015/0184807 A1* | 7/2015 | Vincent | F21K 9/17 362/223 |
| 2015/0184838 A1 | 7/2015 | Li et al. | |
| 2016/0018062 A1 | 1/2016 | Zhang et al. | |
| 2017/0030530 A1 | 2/2017 | Roys | |
| 2017/0051882 A1 | 2/2017 | Engel et al. | |

FOREIGN PATENT DOCUMENTS

| | | |
|---|---|---|
| CN | 202915096 U | 5/2013 |
| CN | 103542273 A | 1/2014 |
| DE | 102009023055 A1 | 12/2010 |
| DE | 102012211934 A1 | 1/2014 |
| DE | 102014214603 A1 | 1/2016 |
| EP | 2554895 A4 | 3/2014 |
| EP | 3009732 A1 | 4/2016 |
| JP | 2009116418 A | 5/2009 |
| JP | 2010123097 A | 6/2010 |
| JP | 2012156056 A | 8/2012 |
| KR | 1020130068957 | 6/2013 |
| WO | 2011122518 A1 | 10/2011 |
| WO | 2013082523 A1 | 6/2013 |
| WO | 2013104624 A1 | 7/2013 |
| WO | 2014048677 A1 | 4/2014 |
| WO | 2014202361 A1 | 12/2014 |
| WO | 2015120929 A1 | 8/2015 |
| WO | 2016012124 A1 | 1/2016 |
| WO | 2016012189 A1 | 1/2016 |
| WO | 2017019644 A1 | 2/2017 |

* cited by examiner

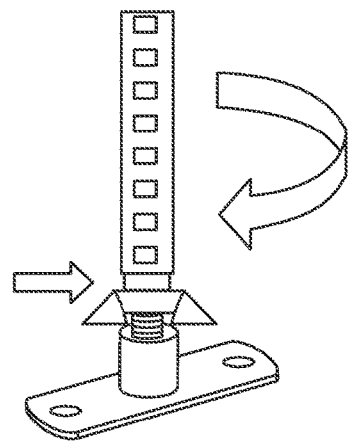
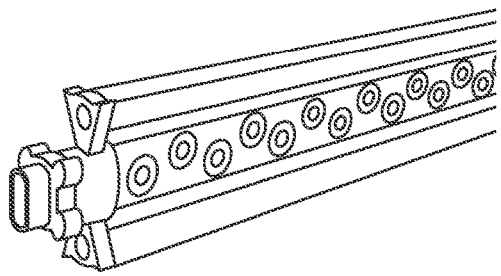
FIG. 1A
(Prior Art)
FIG. 1B
(Prior Art)
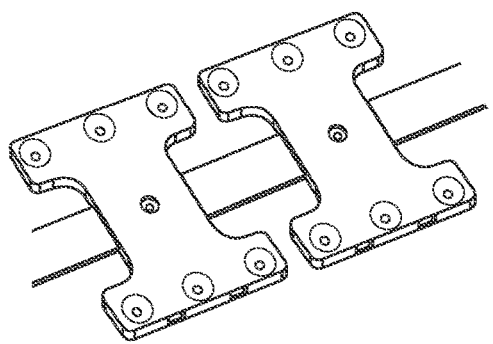
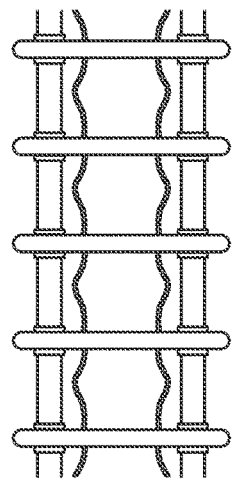
FIG. 1C
FIG. 1D

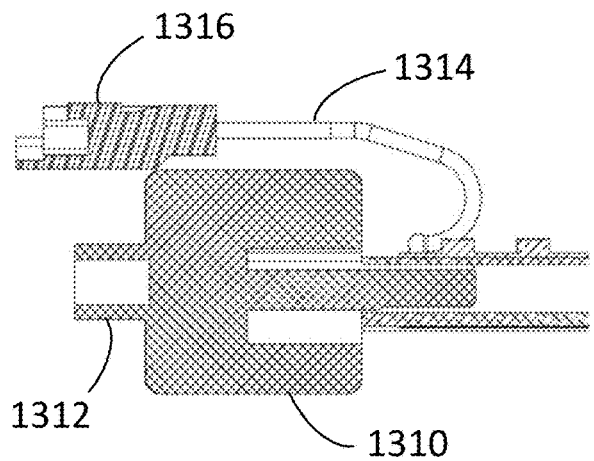
FIG. 18
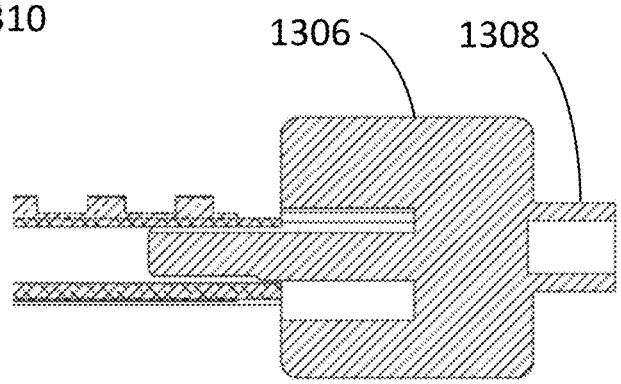
FIG. 19
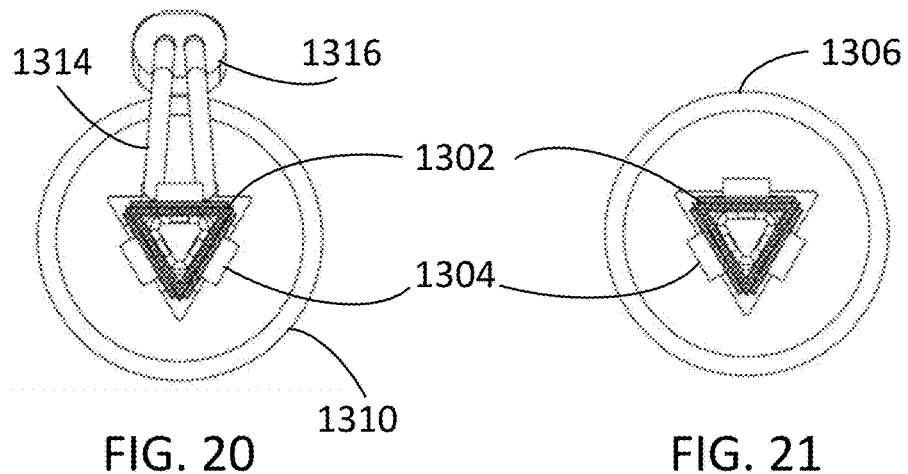
FIG. 20
FIG. 21

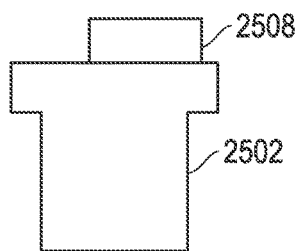
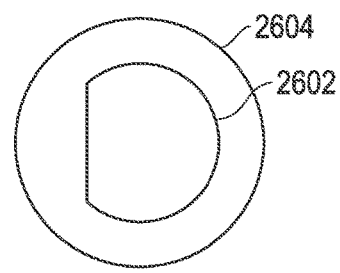
FIG. 26
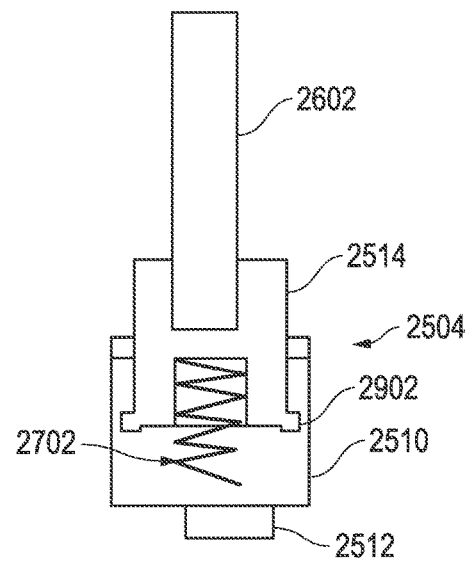
FIG. 27
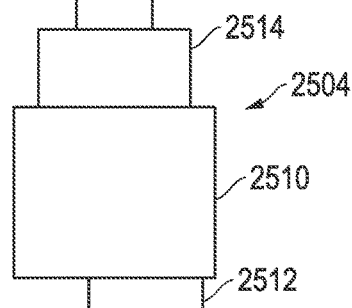
FIG. 25
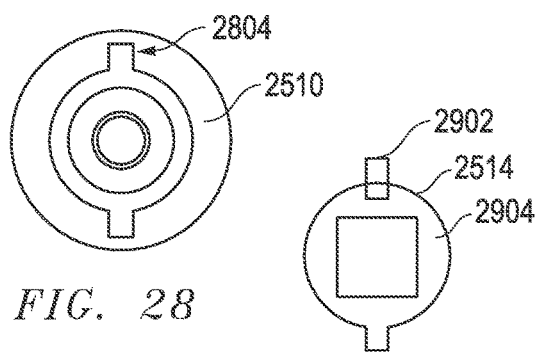
FIG. 28
FIG. 29

METHOD AND ASSEMBLY FOR REPLACING FLUORESCENT LIGHTS

CROSS-REFERENCE TO RELATED APPLICATIONS

The present application claims priority from U.S. Prov. Pat. App. No. 62/196,732, and U.S. Prov. Pat. App. No. 62/196,813, both filed on Jul. 24, 2015, and is a divisional application of U.S. patent application Ser. No. 29/568,321, filed Jun. 16, 2016, all three of which are hereby incorporated by reference.

TECHNICAL FIELD OF THE INVENTION

Fluorescent lights are low pressure mercury-vapor gas-discharge lamps that use fluorescence to produce visible light. An electric current in the gas excites mercury vapor which produces short-wave ultraviolet light that then causes a light-emitting phosphor coating on the inside of the bulb to glow. Incandescent lights are electrical lights which produce light with a wire filament heated to a high temperature by an electric current passing through it until it glows.

Fluorescent lights are used as back lighting for signs. Fluorescent lamps are found in residences, such as in kitchens, basements, or garages, in schools and in businesses because the cost savings when using fluorescent lamps tend to be significant when compared to the cost of incandescent light use. However, recent developments in light emitting diode (LED) technology have made LEDs more efficient and cheaper to use than both fluorescent bulbs and incandescent bulbs. LEDs are a type of solid-state lighting and use a semiconductor to convert electricity into light.

A light bulb's efficiency, or luminous efficacy, is a measure of emitted light, or lumens (lm), divided by the power it draws, or watts (W). A bulb that is 100% efficient at converting energy into light would have an efficacy of 683 lm/W. To illustrate, for example, a 60 W to 100 W watt incandescent bulb has an efficacy of 15 lm/W; an equivalent fluorescent light has an efficacy of 73 lm/W, and current LED-based replacement bulbs on the market range from 70 lm/W to 120 lm/W with an average efficacy of 85 lm/W.

LEDs have many advantages over incandescent light sources and fluorescent light sources including lower energy consumption, longer lifetime, emitting an intended color without using any color filters, higher shock resistance, smaller size, and faster switching. The carbon footprint of LED use is also significantly less than both incandescent lighting and fluorescent lighting. For example, if an average light bulb is on for 10 hours a day, a 40-watt bulb will cause 196 pounds of $CO_2$ emission per year. The 6-watt LED equivalent will only cause 30 pounds of $CO_2$ emission per year. Changing fluorescent lighting to LED lighting would give a 34% reduction in electrical power use around the world and reduce carbon emissions.

Fluorescent tube lamps, such as the ANSI T12 and T8, require a high alternating current voltage, a few hundred volts, to initiate a discharge and start the lamp. The high voltage is provided by a transformer, referred to as a "ballast," which provides a high voltage for starting the lamp and then greatly reduces the current during lamp operation. LEDs do not require a high voltage to start emitting light, and are typically powered by a 12 V or 24 V direct current power supply. The power supply for a fluorescent lamp is therefore not compatible with an LED.

Some LED lamps are made to be installed in existing fluorescent light cabinets, although they typically require disconnecting the fluorescent lamp ballast and providing a low voltage LED power supply. LED lamps for fluorescent lamp replacement typically consist of many individual directional LEDs mounted on a stick or in a tube. They are designed to physically fit in fixtures intended for fluorescent tubes or attach to the structures surrounding the fixtures. This allows replacement of fluorescent bulbs without replacing the entire fixture saving both time and money. One example of a replacement LED tube light is the Qwik Stik by Principal LED (depicted in FIG. 1A). The Qwik Stik can be ordered in various fixed lengths and can either physically fit into the existing fluorescent fixtures or attached to brackets adjacent to the fixtures. To install the Qwik Stik into an existing receptacle, the user must disconnect the power from the ballast to the fixture. If the ballast is not disconnected, unintentional power could flow through the Qwik Stik, causing an electrical hazard.

The LineFit Light LED System by GE (depicted in FIG. 1B) can either physically fit into the existing fluorescent fixtures or be attached to brackets adjacent to the fixtures. The Line Fit has insulating ends, but like the Qwik Stik, comes from the manufacturer in specific lengths. The SignBOX by Sloan (depicted in FIG. 1C) and the Tandem2 by USLED (depicted in FIG. 1D) also replace fluorescent bulbs but require screws and/or other fasteners to be attached inside the fluorescent housing adjacent to the fluorescent fixtures.

Other LED light configurations can be used to replace fluorescent lights as well. For example, a prior art method of replacing ceiling fluorescent light bulbs is described in FIG. 2 and illustrated in FIGS. 3A-3E. This method is very time intensive and requires many steps to complete. To begin, in step 202 (depicted in FIG. 3A), the fluorescent bulbs are taken from the fixtures 302. In step 204 (depicted in FIG. 3B), the ballast cover 304 is removed from the fixture and the DC wires 306, which run to the light cavity, are cut. In step 206, LED strips 308 are cut to a desired length, as seen in FIG. 3C, and the LED strips 308 are placed on the surface of the light housing structure 310, as seen in FIG. 3D. Some LED strips have adhesive backing. Some LED strips come with double sided tape. In step 208, LED to LED connectors 312 are snapped on to the LED strips, as seen in FIG. 3D. In step 210 (depicted in FIG. 3E), the LED strips 308 are wired to the original rocker switch 314 used in the fluorescent fixture.

These prior art LED replacements and methods, however, can be expensive and time-intensive. They typically cost between 15 per foot to 30 per foot depending on if they are single sided or double sided. A prior art method of replacing fluorescent lights with LED tube lights is described in FIG. 4A and illustrated in FIG. 4B. In step 402, base brackets 412 are mounted to each side of the location where the LED tube light 414 is to be placed. In step 404, the LED tube light 414 is inserted onto the threaded base brackets 416, and, in step 406, a wingnut 418 is tightened or loosened to adjust the position of the LED tube light 414 to the desired position.

Furthermore, these prior art LED replacements are potentially dangerous. The ends, for example, of the Qwik Stik are metallic, so, if the electrical power to the fluorescent fixture is still on, the ends of the Qwik Stik become a potential shock hazard. Replacement of sign lighting fluorescent bulbs using prior art methods can be especially dangerous because workers often must replace bulbs at heights of at least 15 feet in the air. Workers having to juggle a drill, screws, and other parts or tools while trying to replace a bulb creates the risk of workers dropping things on anything or anyone below them. It also creates a risk to the workers themselves as they could also accidentally fall to the ground.

LEDs are also more environmentally friendly then fluorescent bulbs and incandescent bulbs. LEDs have longer life spans and do not have to be replaced as many times as fluorescent and incandescent bulbs. They also do not contain mercury such as in fluorescent bulbs, which is a hazardous chemical.

Some prior art LEDs are only manufactured to specific sizes and, therefore, cannot fit every available space for replacement, which raises inventory cost exponentially. For example, the Qwik Stik comes in sizes ranging from 18 inches to 120 inches in 8 inch increments, and the LineFit comes in sizes ranging from 18 inches to 96 inches in 8 inch increments. Other prior art LEDs, such as the Tandem2, can be cut to fit the available space for replacement but they must use 4 strips of lighting to efficiently cover a sign cabinet faces 360 degrees which causes the cost to escalate tremendously and still require additional tools and fasteners to be installed adjacent to the fluorescent fixture.

Therefore, a safer, less expensive, and easier method of replacing fluorescent bulbs and incandescent bulbs with LEDs in fluorescent fixtures and incandescent fixtures, respectively, is necessary.

SUMMARY OF THE INVENTION

An object of the invention is to provide a system, method and kit for the simple assembly and installation of LED lamps into existing fluorescent lamp fixtures.

Some embodiments of the invention use nonmetallic end caps that are supported in a lamp cabinet by the existing mounting hardware. The nonmetallic end caps can be slipped over or into the end of any type of tube that can be cut-to-length to fit in the existing fluorescent lamp fixture. The tube can be either hollow or solid and the tube cross-section can be standard square, round, triangle, hexagonal or any other shape. Any number, type or color of LEDs are mounted on the tube to meet any specific application. The end caps may be supported by the existing mounting hardware in the fixtures, by knock-out holes in the cabinet for mounting conventional fixtures, or by other hardware.

Some embodiments of the invention are directed to a kit for replacing fluorescent tube lights. The kit comprises two end caps that attach to ends of a tube; at least one light emitting diode (LED) that attaches to at least one side of the tube; and an LED power supply for supplying power to the at least one LED. At least one light emitting diode can be at least one trimmable light emitting diode strip. The tube can have a cylindrical, triangle-shaped, square-shaped, or hexagonal-shaped cross-section.

Some embodiments of the invention are directed to a light emitting diode (LED) lamp for replacing fluorescent tube lights. The LED lamp comprises a tube similar in length to a fluorescent tube; two end caps, each end cap disposed at each end of the tube; at least one LED attached to at least one side of the tube; and means for connecting the at least one LED to an LED power supply for supplying power to the at least one LED. The tube can have a cylindrical, triangle-shaped, square-shaped, or hexagonal-shaped cross-section The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which:

FIGS. 1A-1D are examples of prior art LED lights used in sign lighting;

FIG. 18 is a cross sectional view taken along the line 18-18 of FIG. 17;

FIG. 19 is a cross sectional view taken along the line 19-19 of FIG. 17;

FIG. 20 is a cross sectional view taken along the line 20-20 of FIG. 17;

FIG. 21 is a cross sectional view taken along the line 21-21 of FIG. 17; and

FIG. 25 shows an LED lamp assembly for mounting into a D-shaped hole in a lamp cabinet.

FIG. 26 shows a D-shaped hole in a lamp cabinet.

FIG. 27 is an enlarged cross-sectional view of a spring-loaded end cap of the lamp assembly of FIG. 25.

FIG. 28 shows a top view of the fixed portion of the spring-loaded end cap.

FIG. 29 shows a top view of the sliding portion of the spring-loaded end cap.

FIG. 34 shows another embodiment of the invention.

FIG. 35 shows a kit that includes a spring, a fluorescent fixture, an LED carrier that supports LEDs, and a power supply.

FIG. 36 describes a method of replacing fluorescent lightbulbs with LED lighting by installing a spring loaded device into a fluorescent fixture.

DETAILED DESCRIPTION OF THE PREFERRED EMBODIMENTS

Various embodiments of the invention include methods for mounting LED lighting into lamp cabinets, kits for converting fluorescent lighting to LED lighting, and end caps for installation on a mounting tube that can be cut-to-length to fit into any fluorescent lamp cabinets or housing. The end caps can be mounted onto or into existing fixtures or can mount into standard fixture-mounting holes in the lamp cabinet as seen in FIG. 6C.

Some embodiments provide a method of replacing fluorescent tube lights with LED lighting. In some embodiments, the method includes cutting a tube to a predetermined length; fitting at least one end cap to at least one side of the tube, preferably without screws or other connectors, the at least one end cap preferably being a single extruded structure; attaching at least one LED to the tube in a desired pattern; and fitting the tube in a space that previously held at least one fluorescent tube light.

Some embodiments provide a kit for replacing fluorescent tube lights. In some embodiments, the kit includes at least two end caps that attach to opposing sides of a tube and at least one LED that attaches to at least one side of the tube. The kit may include a tube that fits into the end caps, or the tube can be acquired separately.

Figure 11:
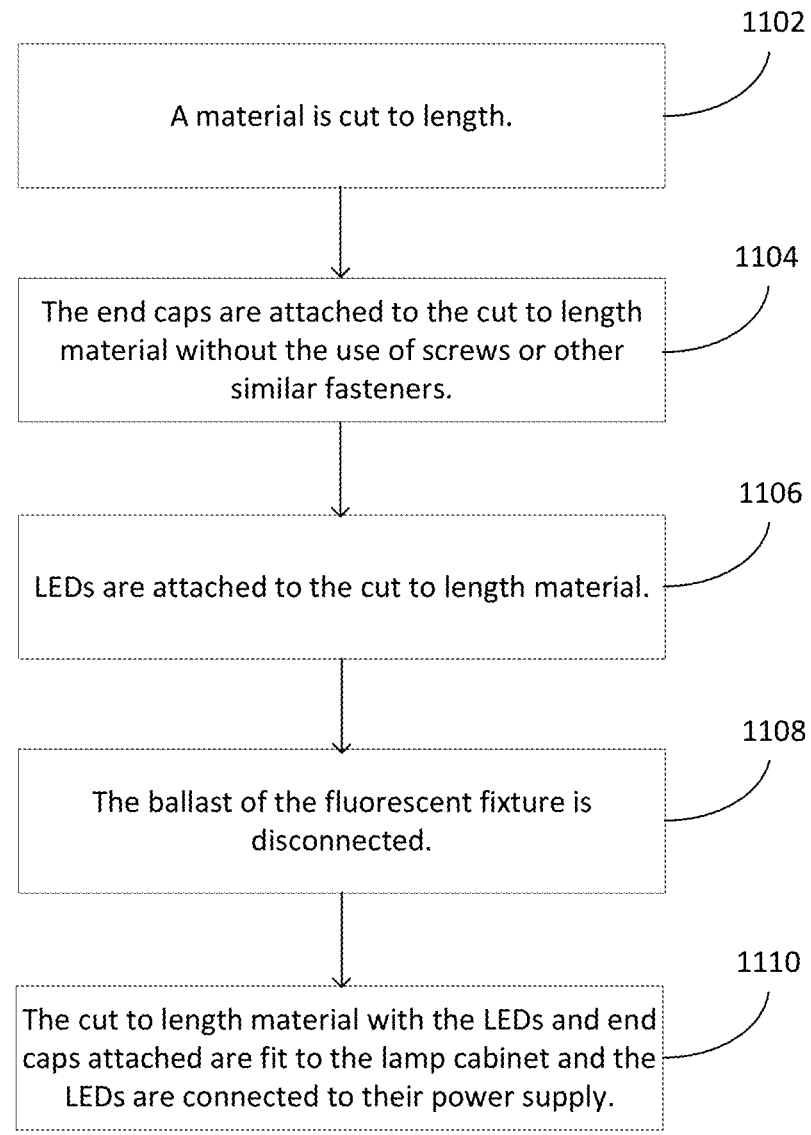
FIG. 11 is an embodiment invention that describes a method of replacing fluorescent bulbs in fluorescent fixtures with LED lighting.

FIG. 11 describes an embodiment of the invention that replaces fluorescent bulbs in fluorescent fixtures with LEDs with a cut-to-length tube with end caps attached, as seen, for example, in FIGS. 6A, 6B, 7A, and 7B. In Step 1102, a tube is cut-to-length. In step 1104, end caps are attached to each end of the cut-to-length tube. The tube and the end cap have mating shapes so the tube can be inserted into or over the end cap. Different styles of end caps preferably fit different ones of common fluorescent fixtures, such as fixtures for T-5, T-8 and T-12 lamps. In some embodiments, the end caps fit inside existing fluorescent fixtures or standard knock out holes. In some embodiments, the end caps slide over the outside of existing fluorescent fixtures. In some embodiments, there are no existing fixtures present and the end caps hold the tube in place by friction.

In step 1104, LEDs are placed on the exterior surface of the tube in a desired pattern. The 120 V ballast of the fluorescent fixture is disconnected in step 1108. If the end caps are insulating, then disconnecting the ballast is not strictly necessary, but is preferred. In step 1110, the tube with the attached end caps and LEDs is positioned in the cabinet. The end caps either fit inside the existing fluorescent fixtures or standard knock out holes in the cabinet or slide over the existing fluorescent fixtures. In step 1110, the LEDs are then connected to a low voltage driver to convert line voltage, such as 110 VAC, to 5 VDC, 12 VDC, 24 VDC or other voltage required by the LEDs at a constant current. This process allows LED replacement of fluorescent bulbs without the need to remove or alter the entire fixture.

In some embodiments, the end caps can be attached to the tube with an adhesive, such as glue, tape, epoxy, or a similar compound. In some embodiments, the end cap is maintained on the tube by a friction fit. In some embodiments, the end caps and the tube include a threading allowing the end caps to screw onto the ends of the tubing. In some embodiments, the end caps have a recessed inner portion distal to the existing fixture that fits inside the tube and holds the end caps in place. In some embodiments, the distal side of the end caps to the existing fixture has a greater cross section area then the tube and can slide onto the end of the tube, holding the end caps in place by friction. In some embodiments, the end caps are made of rubber.

Figure 2:
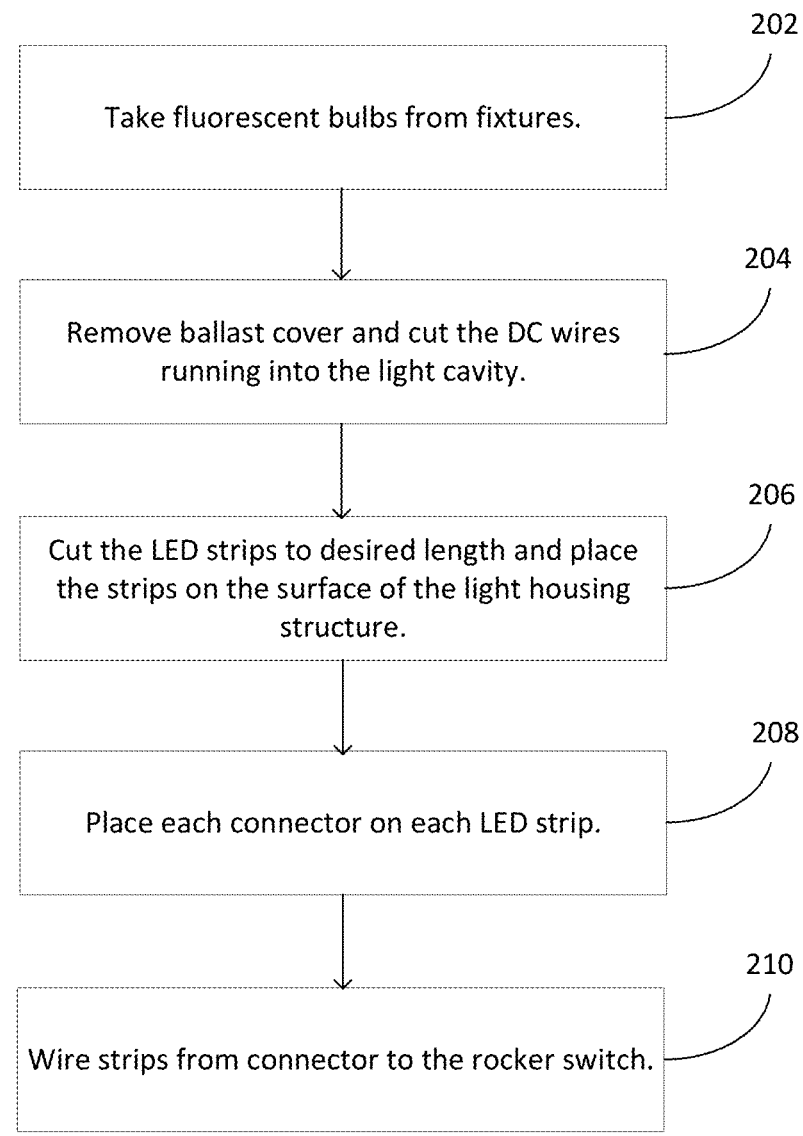
FIG. 2 is a prior art method of replacing fluorescent bulbs with LED strips.
Figure 3A:
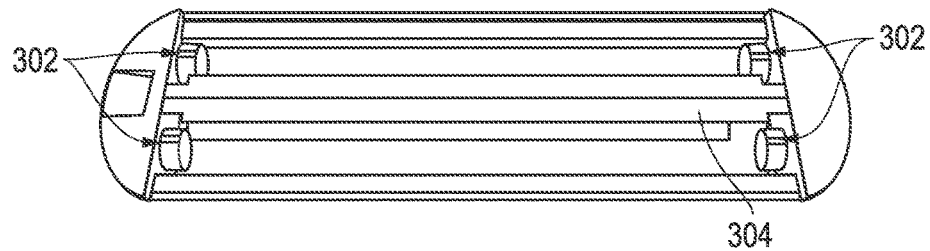
FIGS. 3A-3E illustrate the method described in FIG. 2.
Figure 3B:
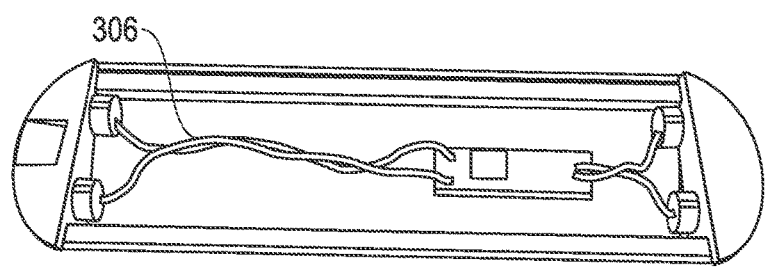
Figure 3C:
Figure 3D:
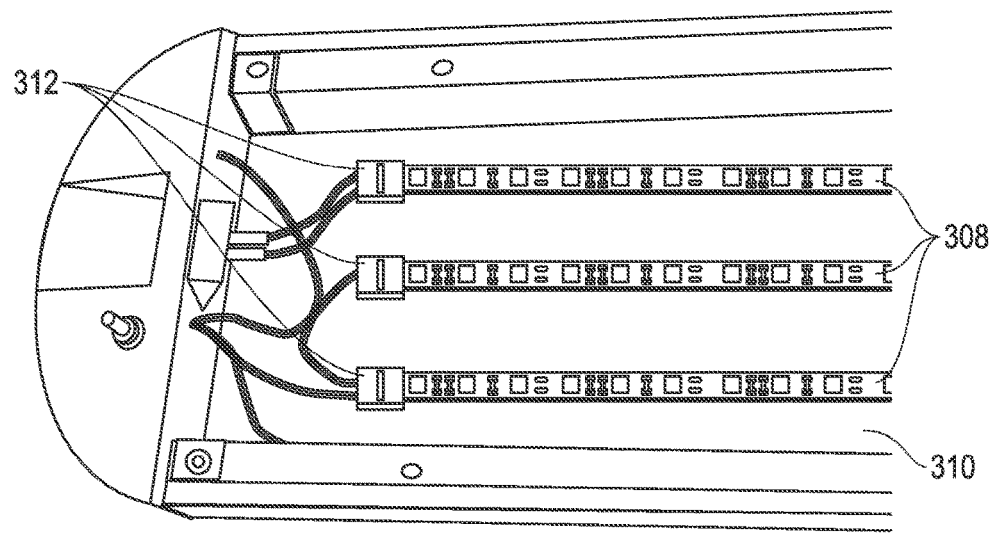
Figure 3E:
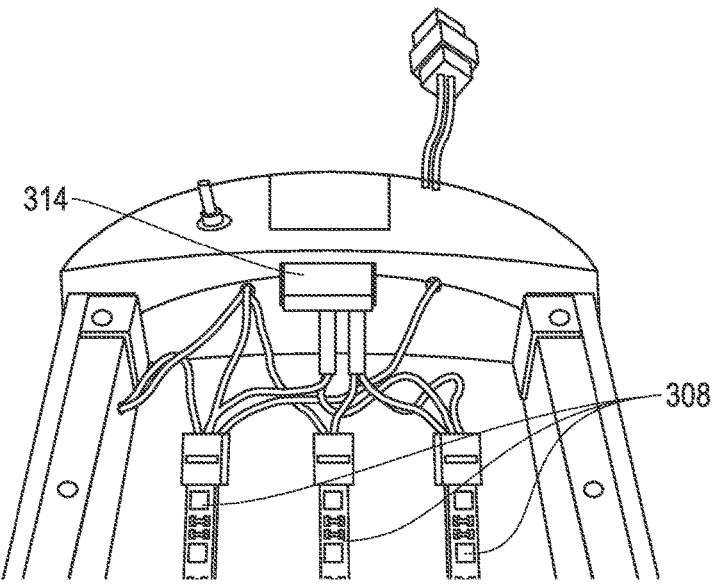
Figure 4A:
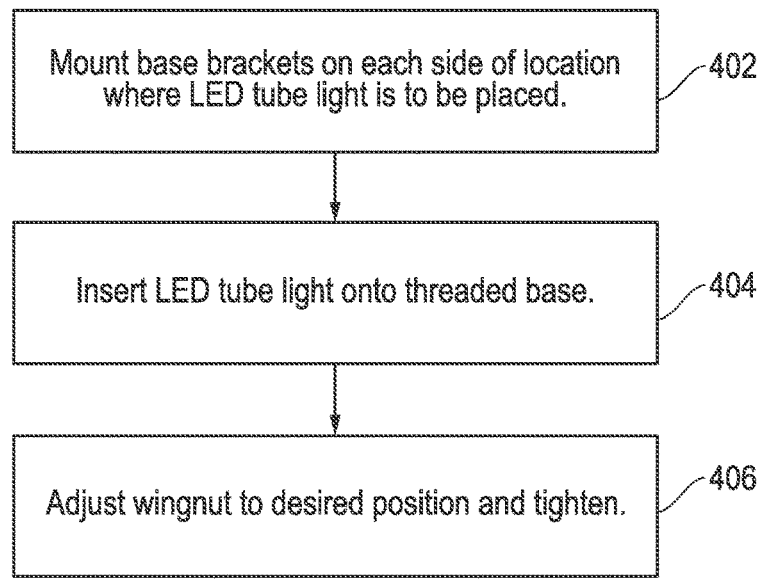
FIG. 4A is a prior art method of replacing fluorescent bulbs with LED tube lights.
Figure 4B:
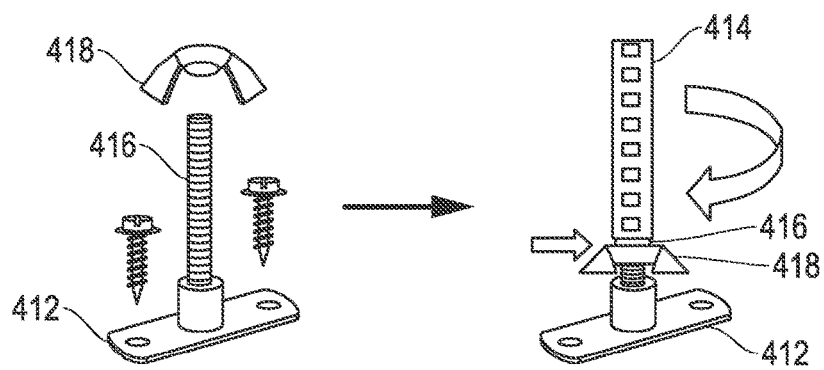
FIG. 4B illustrates the method described in FIG. 4A.
Figure 5A:
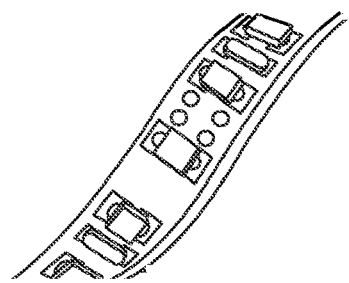
FIGS. 5A-5D show examples of LEDs that can be used with embodiments of the invention.
Figure 5B:
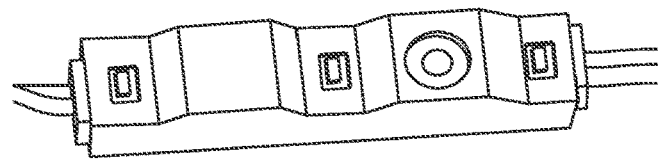
Figure 5C:
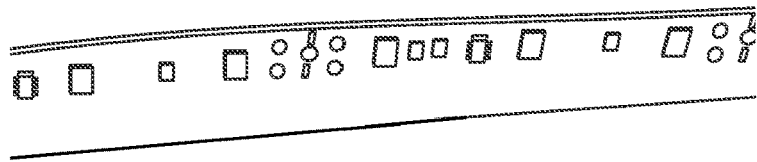
Figure 5D:
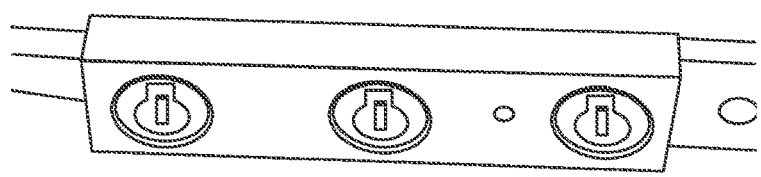
Figure 6A:
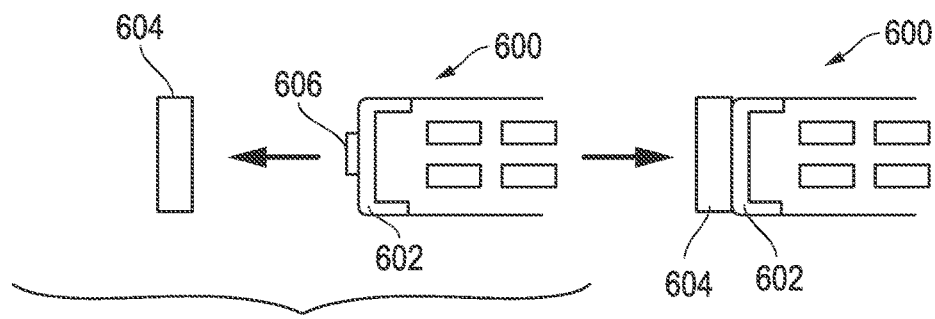
FIGS. 6A-6B illustrate some embodiments of the end caps.
Figure 6B:
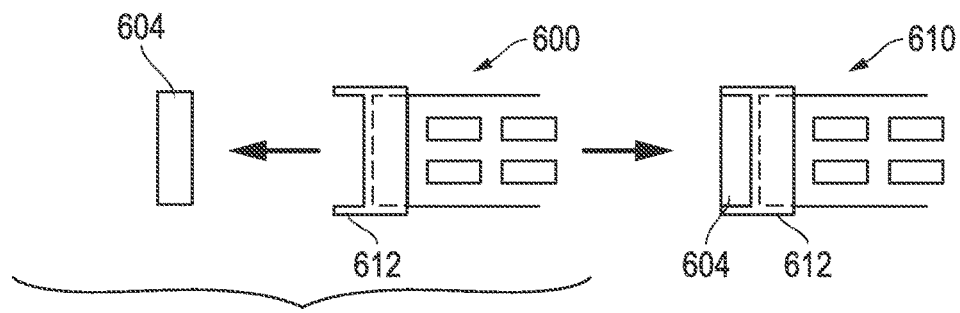
Figure 6C:
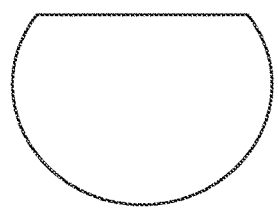
FIG. 6C shows knock-out holes in the cabinet for mounting conventional fixtures.

FIGS. 6A-6B illustrate some embodiments of the end caps. In FIGS. 6A-6B, only one side of the tube fitted with an end cap is shown but each side of the tube may be represented in the drawing. In some embodiments of the invention, the end caps are the same on both sides of the tube that is cut-to-length to fit into the existing fluorescent fixtures or standard mounting holes in a lamp cabinet as seen in FIG. 6C. In some embodiments, the end caps are different on each side of the tube. The choice of which end cap is attached on each side of the tube may be based on convenience, replacement limitations such as fixtures present or lack thereof, and personal choice.

FIG. 6A shows an embodiment of the invention. A cut-to-length tube has an attached end cap 602 that has an extended portion 606 which fits inside an existing fixture 604 or a standard fixture mounting hole. In some embodiments, the end cap is a conventional male end of a fluorescent lamp and the fixture is the corresponding female fluorescent fixture. The tube 600 is pushed into the fixture 604 and the end cap 602 holds the LED replacement assembly 600 in place. In some embodiments, the fixture 604 locks the end cap 602 into place when the end cap 602 is rotated in the fixture 604 from an unlocked position to a locked position.

FIG. 6B shows another embodiment of the invention. An LED replacement assembly 610 includes an end cap 612. The end cap 612 has a shape and size that when the LED replacement assembly 610 is pushed against the fixture 604, the end cap 612 encapsulates the fixture 604.

In some embodiments, there is no fixture or mounting hole and the tube is held in place by the friction properties of the end caps alone. In some embodiments the end cap is made of rubber or styrofoam. Examples of LEDs used in embodiments of the invention are shown in FIGS. 5A-5D. Some embodiments of the invention preferably use omnidirectional or flood LEDs.

Figure 7A:
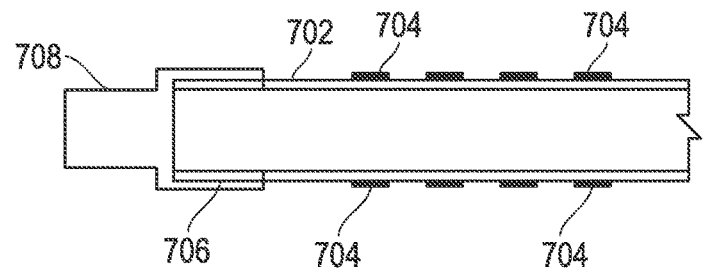
FIG. 7A illustrates some embodiments of the invention where the tube is positioned inside a cup or other mating surface on the end cap.
Figure 7B:
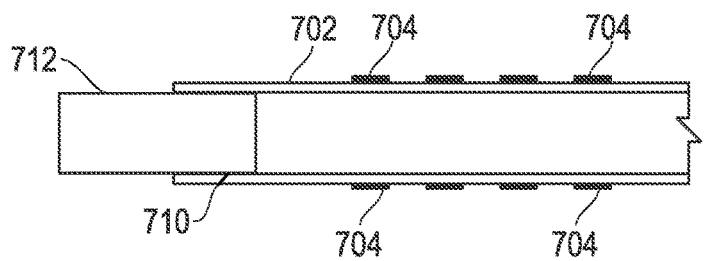
FIG. 7B illustrates some embodiments of the invention where the tube is positioned outside of a mating surface on the end cap.

As shown in FIG. 7A, the tube 702 on which LEDs 704 are mounted can be positioned inside a "cup" 706 or other mating surface on the end cap 708 as shown in FIG. 7A. Alternatively, as shown in FIG. 7B, the tube can be positioned outside of a mating surface 710 on the end cap 712. In some embodiments, the other end of the end cap 708 or 712 is connected, directly or indirectly to the cabinet for support, for example, by plugging into a fixture affixed to the cabinet in the same way that a fluorescent lamp would plug into the fixture, by being inserted over the fixture, or by being connected directly to the cabinet.

Figure 8A:
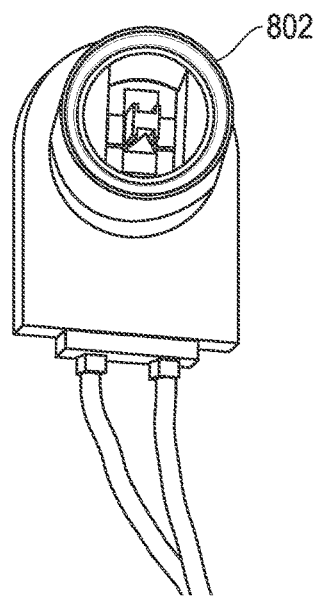
FIG. 8A shows a typical fluorescent lamp fixture that is to be mounted in a lamp cabinet.
Figure 8B:
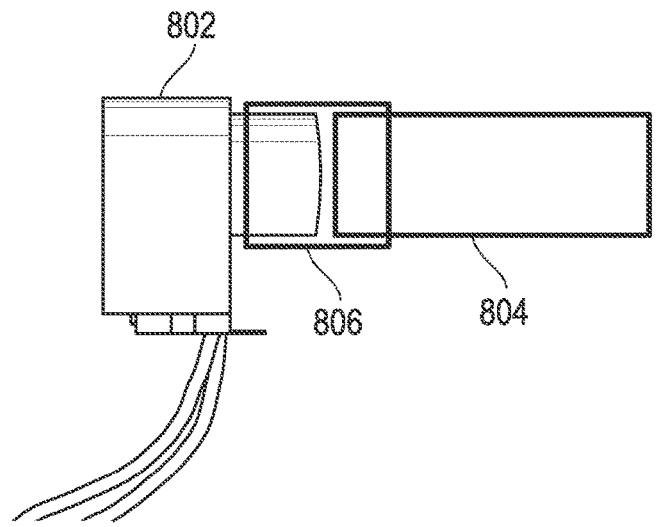
FIG. 8B shows an end cap, according to some embodiments of the invention, positioned over the protruding portion of the fixture shown in FIG. 8A.
Figure 9:
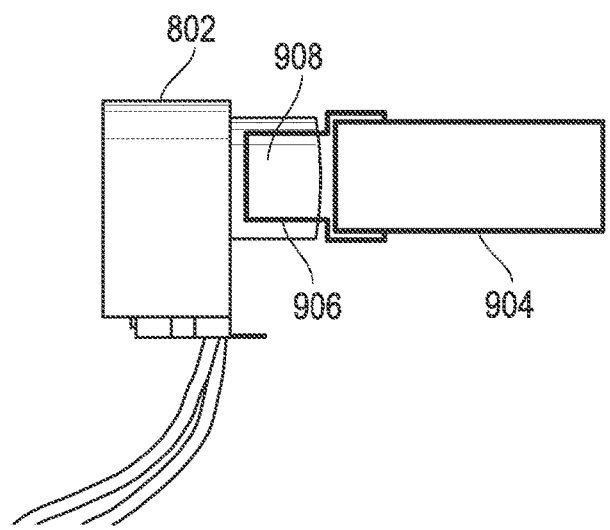
FIG. 9 shows an end cap, according to some embodiments of the invention, that fits inside the protruding portion of the fixture shown in FIG. 8A.

FIG. 8A shows a typical fluorescent lamp fixture 802 that is to be mounted in a lamp cabinet. FIG. 8B shows an end cap 806 positioned over the protruding portion of fixture 802, and cut-to-length tube 804 is inserted into, or in some embodiments over, the other side of the end cap. FIG. 9 shows an endcap 906 including a portion 908 that fits into fixture 802.

The cut-to-length tube used with any embodiment can be standard plastic or metal tubing of any shape. These shapes include cylindrical, triangle-shaped, square-shaped, and hexagonal-shaped. The cut-to-length tube can be composed of any hollow or solid. The end caps are nonmetallic. A kit in accordance some embodiments of the invention can include end caps, LEDs with a means for attaching to the tube, and a power supply for the LEDs. The LEDs can be attached to the tube using adhesives or mechanical fasteners.

Figure 10:
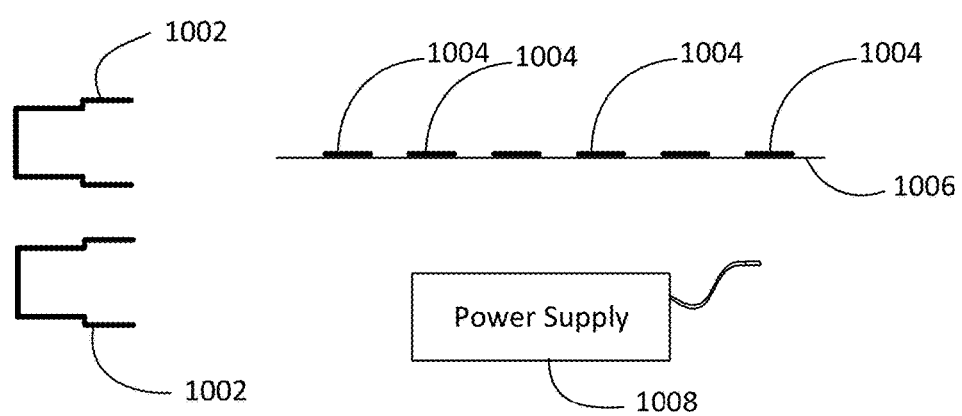
FIG. 10 shows a kit that includes 2 end caps, an LED carrier that supports LEDs, and a power supply.

FIG. 10 shows a kit that includes 2 end caps 1002, an LED carrier 1006 that supports LEDs 1004. LED carrier 1006 can be broken off to any length. Multiple carriers 1006 can be connected together to form a longer chain of LEDs. The maximum number of LEDs is determined by a power supply 1008. Tubing or a similar hollow or solid tube that can be cut-to-length is optionally supplied with a kit, although tubing is readily available and found, for example, in most commercial sign shops. Tubing or the similar hollow or solid tube can be a conductor or an insulator. LED carrier 1006 can be attached to the tubing, either by the end user, or it may come from the manufacturer already attached to the tubing.

Figure 12A:
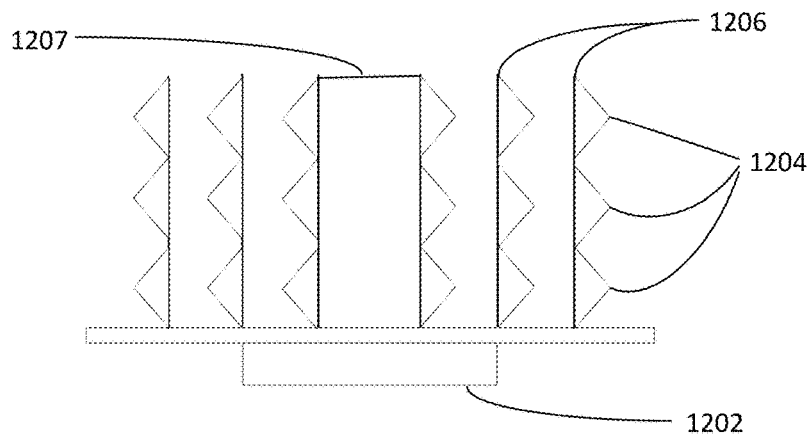
FIG. 12A is a cross sectional side view of an embodiment of the end caps which fit into a piece of tubing.
Figure 12B:
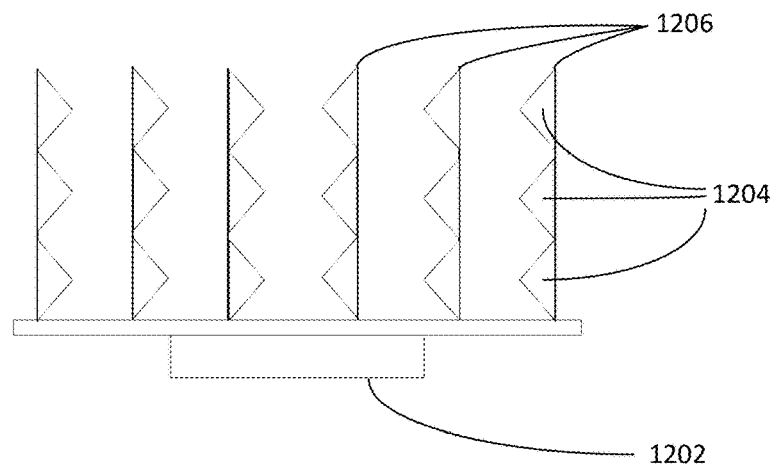
FIG. 12B is a cross sectional side view of an embodiment of the end caps which slide over the sides of a tube.

FIGS. 12A and 12B show other embodiments of the end caps. FIG. 12A depicts an end cap that can fit into tubes of different sizes. For example, the end cap can fit into tubing with a diameter of 1 inch, ¾ inch or ½ inch. Having a single end cap that can accommodate tubes of different diameters reduces the number of different end caps required to manufactured and stocked, reducing costs in the supply chain. Mating structure 1202 fits the end cap into existing fluorescent fixtures or standard knock out holes in a lamp cabinet as described in several embodiments above. Mating structure 1202 can resemble or mimic the structure of a typical male end of a fluorescent tube light. Flange 1206 includes structures 1204 that slide on the inside of a tube to hold the end caps in place. Structure 1207 can either be hollow or solid.

FIG. 12B depicts an end cap that slides over various sizes of tubing. For example, the end cap can slide over tubing with a diameter or 1 inch, ¾ inch or ½ inch. Mating structure 1202 fits the end cap into existing fluorescent fixtures or standard knock out holes in a lamp cabinet. Mating structure 1202 can resemble or mimic the structure of a typical male end of a fluorescent tube light. Flange 1206 includes structures 1204 that slide over sides of tubing. Another end cap (not shown) could include both the outer facing 1204 of FIG. 12A and the inner facing structures 1204 of FIG. 12B so that the mating tube could be mounted either on the inside or the outside of the end cap.

Flanges 1206 are nonconductive and preferably flexible to allow flanges 1206 to slide into and around tubes of differing sizes. Structures 1204 are depicted as triangular in FIGS. 12A and 12B; however, they can be other shapes and sizes, such as semi-circles or quadrilaterals. Structures 1204 also can vary in number and are not limited to having only three on each flange.

Flanges 1206 and structures 1204 preferably hold the end cap in place on tubing without any connectors or fasteners. In some embodiments, however, fasteners, or screws, can hold flanges 1206 in place on the tubing.

Figure 12C:
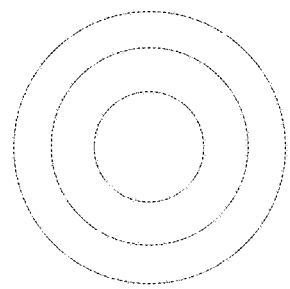
FIG. 12C is a bottom view of an embodiment of the end caps.

FIG. 12C shows a bottom view of the flanges of the end caps of FIGS. 12A and 12B according to some embodiments of the invention. The flanges are arranged in concentric circles with each circle having a different diameter corresponding to a certain size of tubing. For example, the outer flange circle has a diameter suitable for fitting into or sliding over a tube with a diameter of 1 inch; the middle flange circle has a diameter suitable for fitting into or sliding over a tube with a diameter of ¾ inch; and the inner flange circle has a diameter suitable for fitting into or sliding over a tube with a diameter of ½ inch. The number of flange circles can vary in number and are not limited to three as seen in FIGS. 12A-12C. The end cap is adapted to be connected to the tubing without screws or other connectors as described above. This facilitates connecting the end cap to conventional tubing cut in the field rather than requiring the end cap to be attached to the LED support in a factory as in prior art LED strips.

In some embodiments, the end cap is constructed as a single integral structure. That is, the end cap is, for example, a single molded, extruded, or cast part and not constructed from two parts that are bolted together.

Figure 13:
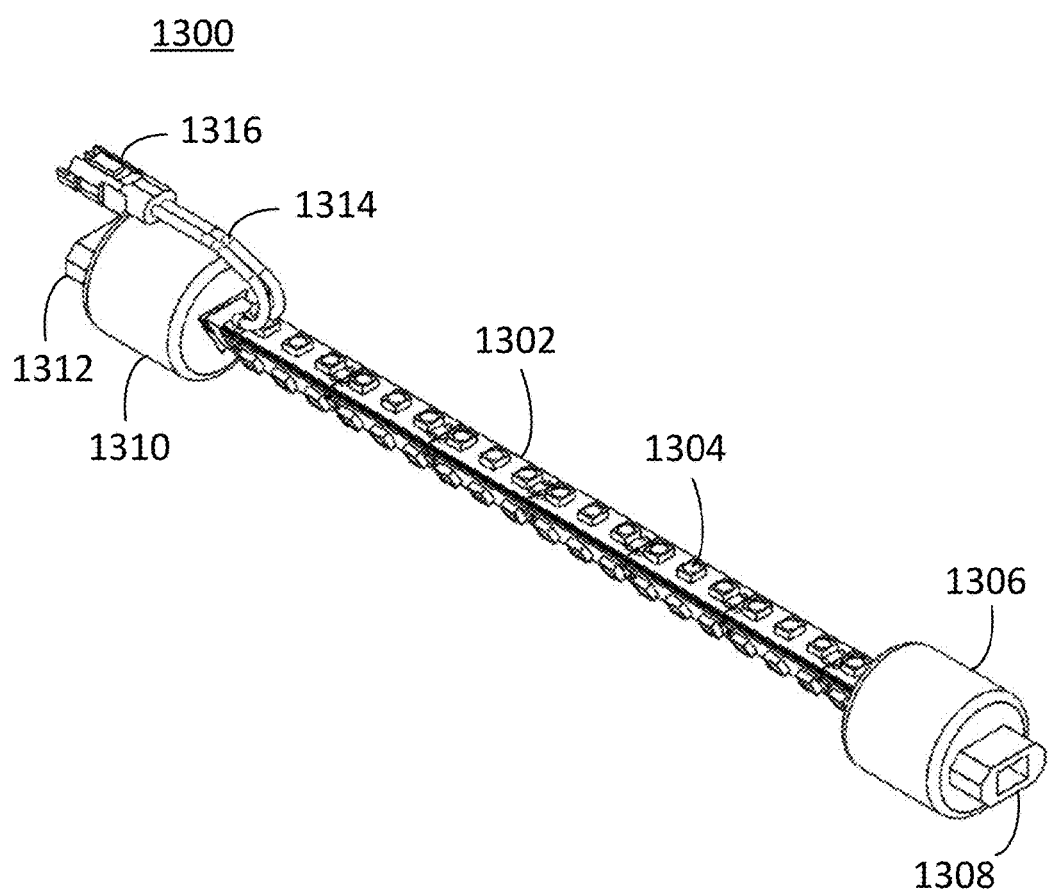
FIG. 13 is a perspective view of an embodiment of an LED lamp in accordance with the present invention.

FIG. 13 is a perspective view of an embodiment of an LED lamp in accordance with the present invention. LED lamp 1300 comprises tube 1302, end cap 1306, and end cap 1310. Tube 1302 is shown, for purposes of example, as comprising three long, flat members arranged at 120 degree angles with each other forming a tube having a triangular cross section. Other tube arrangements are also within the scope of this disclosure. For example, tube 1302 can comprise four long, flat members arranged at 90 degree angles with each other forming a tube having a rectangular cross section. Tube 1302 can also comprise a long round member forming a tube having a circular cross section. Tube 1302 is populated with LEDs 1304. Tube 1302 can comprise a rigid substrate to which prior art LED strips are affixed. Tube 1302 can comprise one or more printed circuit boards populated with surface mount LEDs and supporting electronics.

Disposed at one end of tube 1302 is end cap 1306. End cap 1306 includes fitting 1308. Fitting 1308 is shaped so that fitting 1308 can be received in a complimentary-shaped fitting in a light fixture. Fitting 1308 can comprise a standardized fitting used for light fixtures used with longitudinal-shaped lamps, such as fluorescent tube fixtures.

Disposed at the other end of tube 1302 is end cap 1310. End cap 1310 includes fitting 1312, power cord 1314, and power plug 1316. Fitting 1312 is shaped so that fitting 1312 can be received in a complimentary-shaped fitting in a light fixture. Fitting 1312 can comprise a standardized fitting used for light fixtures used with longitudinal-shaped lamps, such as fluorescent tube fixtures. Power cord 1314 and power plug 1316 provide electric power to LEDs 1304.

Figure 14:
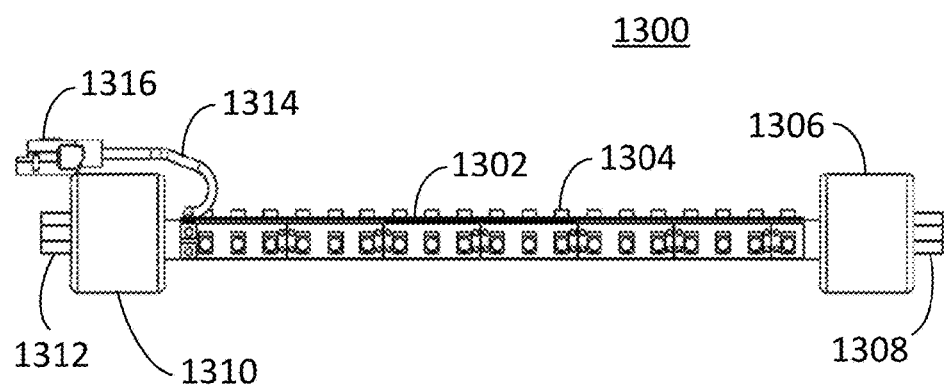
FIG. 14 is a front elevation view of the embodiment in FIG. 13.
Figure 15:
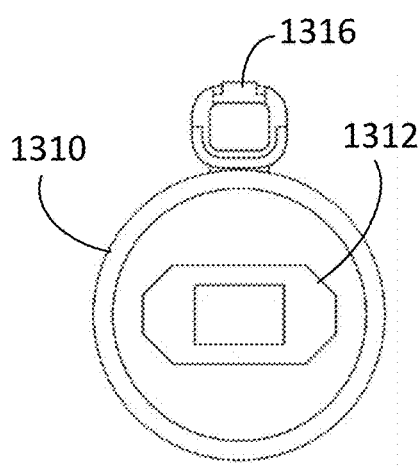
FIG. 15 is a left elevation of the embodiment in FIG. 13.
Figure 16:
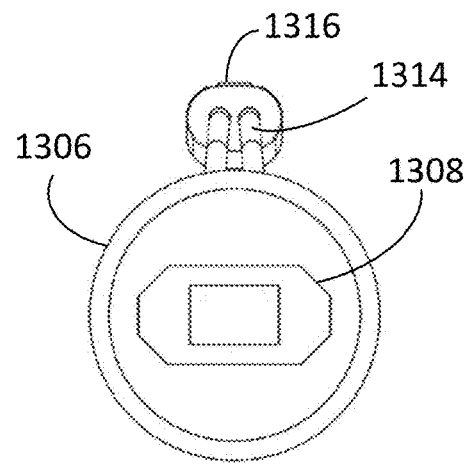
FIG. 16 is a right elevation of the embodiment in FIG. 13.
Figure 17:
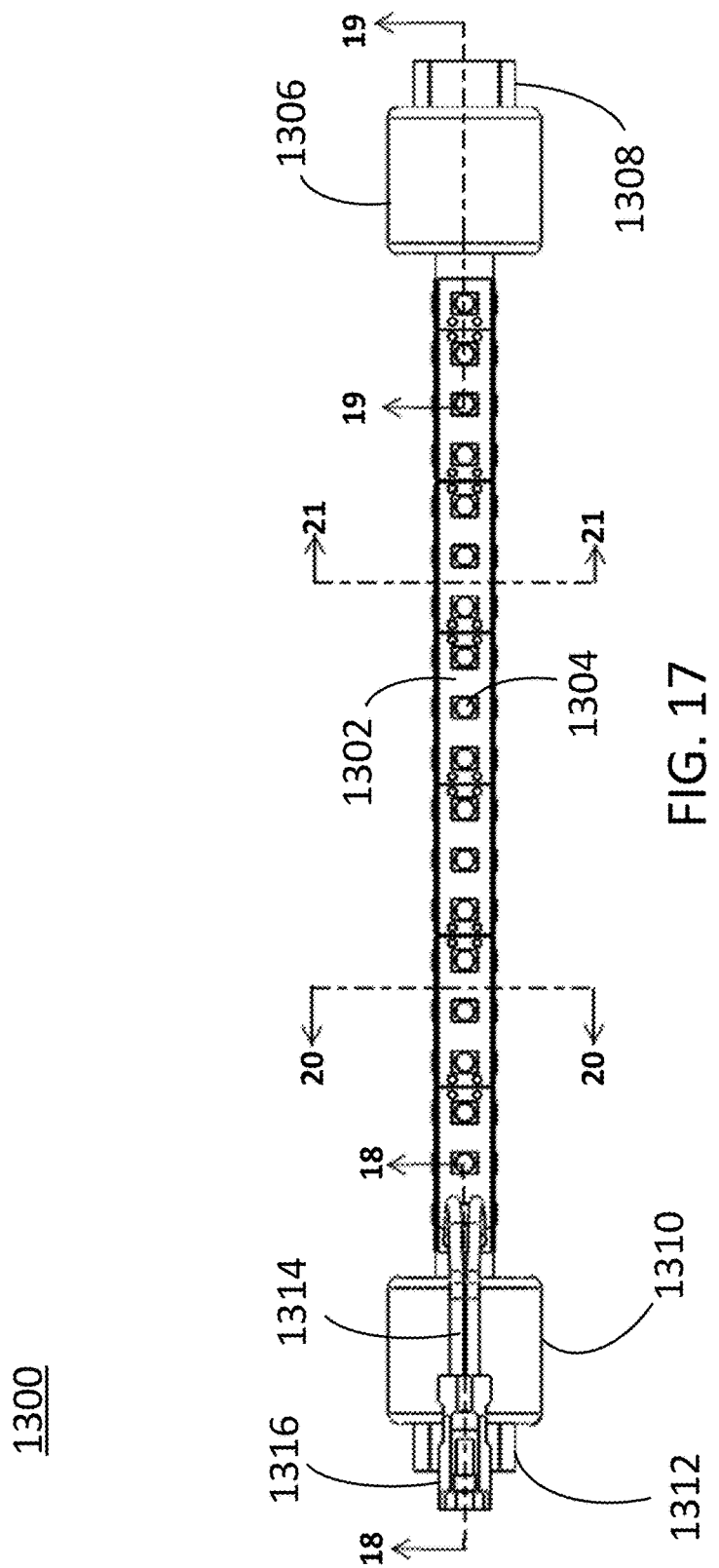
FIG. 17 is a plan view of the embodiment in FIG. 13.
Figure 22:
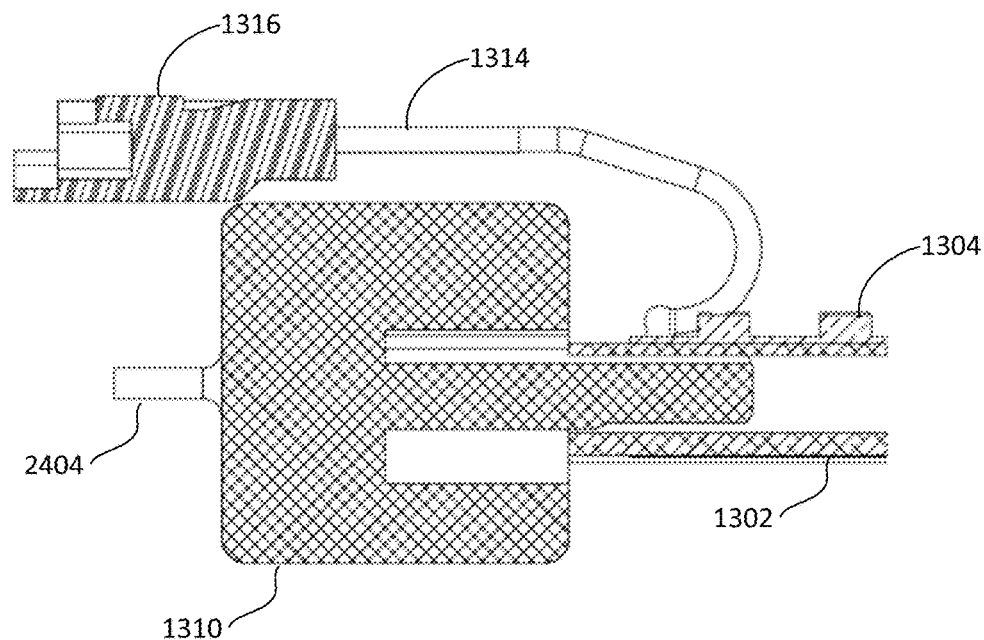
FIG. 22 is a cross sectional view similar to that of FIG. 18, of an end cap having a two-pin connector.
Figure 23:
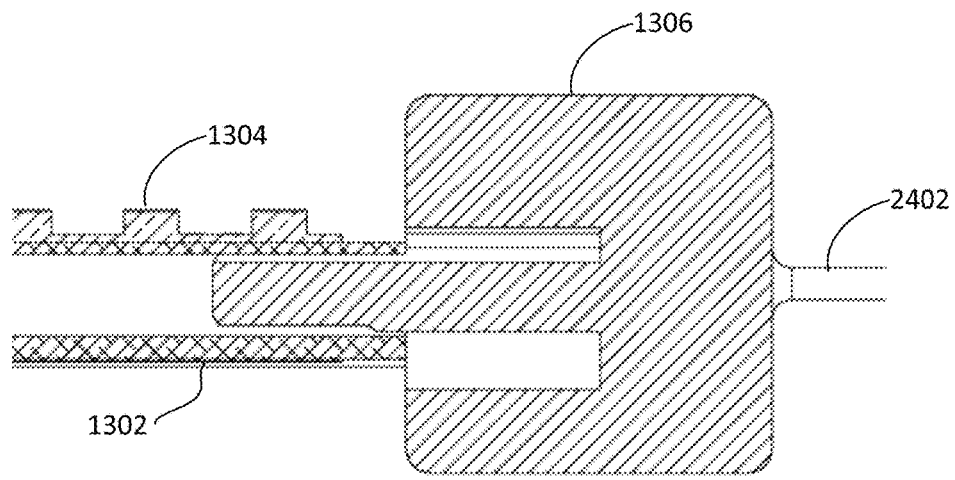
FIG. 23 is a cross sectional view similar to that of FIG. 19, of an end cap having a two-pin connector.

FIG. 14 is a front elevation view of the embodiment in FIG. 13. FIG. 15 is a left elevation of the embodiment in FIG. 13. FIG. 16 is a right elevation of the embodiment in FIG. 13. FIG. 17 is a plan view of the embodiment in FIG. 13. FIG. 18 is a cross sectional view taken along the line 18-18 of FIG. 17. FIG. 19 is a cross sectional view taken along the line 19-19 of FIG. 17. FIG. 20 is a cross sectional view taken along the line 20-20 of FIG. 17. FIG. 21 is a cross sectional view taken along the line 21-21 of FIG. 17. FIGS. 20 and 21 show that tube 1302 has a triangular cross-section. The cross-sections shows the sides of tube 1302 substantially form an equilateral triangle. The sides are oriented at substantially 120 degree angles to each other. Other tube arrangements are also within the scope of this disclosure. For example, tube 1302 can a rectangular cross section with sides arranged at 90 degree angles. Tube 1302 can also have a circular cross section.

Figure 24:
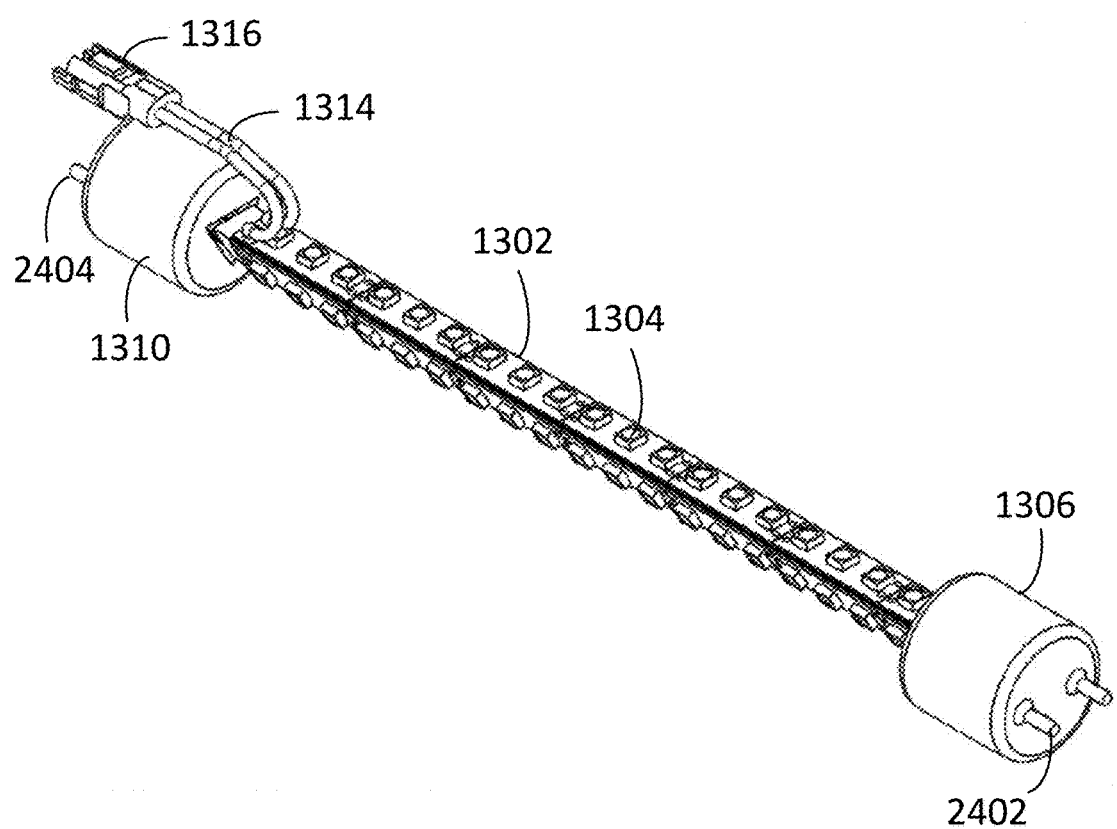
FIG. 24 is a perspective view of an alternative embodiment of an LED lamp having a triangular tube in accordance with the present invention.

FIG. 24 is a perspective view of an alternative embodiment of an LED lamp having a triangular tube in accordance with the present invention. End cap 1306 has an alternative fitting 2402 that is adapted for a type of light fixture that receives a fitting having two pins. End cap 1310 has an alternative fitting 2404 that is adapted for a type of light fixture that receives a fitting having two pins.

While in many embodiments the end caps are inserted into or over existing fixtures, in constructing new lamp cabinets, the end caps can be designed to be inserted directed into the lamp cabinet and there is no need to install fluorescent fixtures having electrical connectors that will not be used merely to provide mechanical mounting for the end caps. When the end cap and lamp tube are mounted over existing fluorescent fixtures, the existing fixtures provide a spring on one side that is holds the end cap and LED tube in place. When end caps are used in new construction without existing fixtures, springs must be provided.

FIG. 25 shows a lamp assembly 2500 having a fixed end cap 2502 and spring loaded end cap 2504 with an LED support tube 2506 supported between the end caps 2502 and 2504. Support tube 2506 includes LEDs mounted thereon. Fixed end cap 2502 includes a boss 2508 that fits within a D-shaped hole 2602 (FIG. 26) in the lamp cabinet 2604. Spring loaded end cap 2504 includes a fixed portion 2510 having a boss 2512 that fits into a D-shaped hole in the lamp cabinet and a sliding portion 2514.

FIG. 27 shows a cross section of spring-loaded an end cap 2504. Sliding portion 2514 slides in fixed portion 2510 and is biased outward by a spring 2702. LED support tube 2506 on which the LEDs are mounted fits in a mating hole 2904 (FIG. 29) in sliding portion 2514. The sliding portion 2514 can be locked within fixed portion 2510.

FIG. 28 is a top view of fixed portion 2510. FIG. 29 is a top view of sliding portion 2514. Tabs 2902 on sliding portion 2514 fit through slots 2804. After inserting spring 2702 into a blind hole in sliding portion 2514, tabs 2902 are aligned with slots 2804, and sliding portion 2514 is inserted into fixed portion 2510. Sliding portion 2514 is then rotated so that tabs 2902 no longer align with slots 2804, locking sliding portion 2514 in fixed portion 2510, with sliding portion 2514 being biased away from boss 2512 by the spring 2702.

Figure 30A:
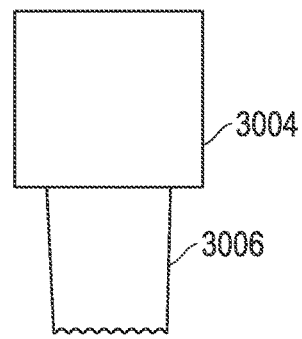
FIG. 30A shows a fixed portion of an end cap having a plug for inserting into a drilled hole in a lamp cabinet.
Figure 30B:
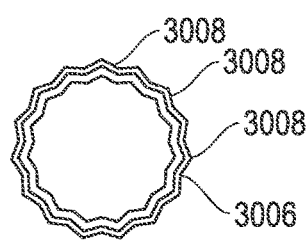
FIG. 30B shows a view of the plug portion of FIG. 30A.
Figure 32:
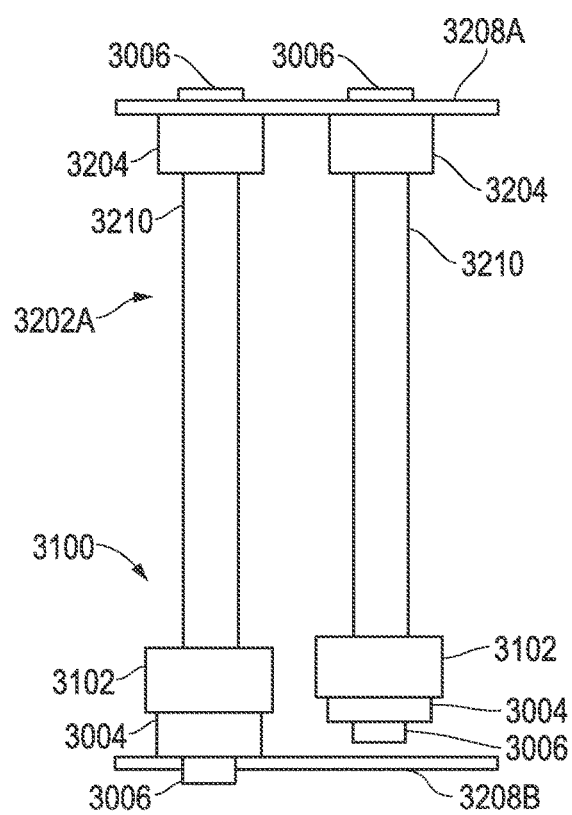
FIG. 32 shows a first lamp assembly mounted in a lamp cabinet and a second lamp assembly being mounted.
Figure 31:
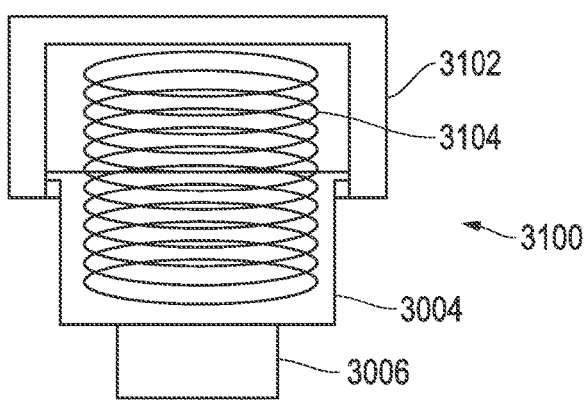
FIG. 31 shows a cross section of an end cap using a plug as in FIG. 30A.

FIG. 30A shows an end cap 3002 that fits into a round hole drilled in the lamp cabinet, rather than fitting into a D-shaped hole, thereby eliminating the requirement of using an expensive D-punch to create the holes. End cap 3002 includes a fixed portion 3004 and a plug portion 3006 that is inserted into a round hole drilled into the cabinet. FIG. 30B shows that plug 3006 has ridges 3008 that fit tightly into the hole in the cabinet to prevent end cap 3002 from rotating after it is inserted. Other means to secure plug 3006 into a hole and prevent rotation can be used. Fixed portion 3002 can include a receptacle for a lamp tube or, as shown in FIG. 31, can be part of a spring-loaded end cap 3100 and can accommodate a sliding portion 3102 with a biasing spring 3104. FIG. 32 shows two lamp assemblies 3202A and 3202B, each having a fixed end cap 3204, a spring loaded end cap 3100 and a lamp tube 3210 on which LEDs are mounted. Lamp 3202B is shown with the spring-loaded end cap compressed to allow lamp assembly 3202 to be mounted in a cabinet 3208 between cabinet walls 3208A and 3208B, while lamp 3202A is shown with the spring extended and lamp 3208A secured into the lamp cabinet.

Some embodiments provide a method of mounting LEDs in fluorescent tube cabinets or other fixture holders. Embodiments of the method comprise mounting a spring to a first fixture, the spring being mounted after factory assembly of the first fixture; mounting the first fixture into a first side of a lamp cabinet or other fixture holder, the first fixture including a first receptacle for a tube; installing a first end of a tube into the first receptacle in the first fixture mounted in the lamp cabinet, the tube having LEDs on the tube's exterior surface, and compressing the spring and inserting the second end of the tube into a receptacle at a second position of the lamp cabinet or fixture holder. The method may include disconnecting the ballast from the fixture and connecting the LEDs to an LED driver.

Some embodiments provide a kit for replacing fluorescent tube lights comprising at least one mounting fixture, which has a receptacle for a tube; at least one spring; at least one LED that mounts onto the tube; and an LED driver.

Figure 33A:
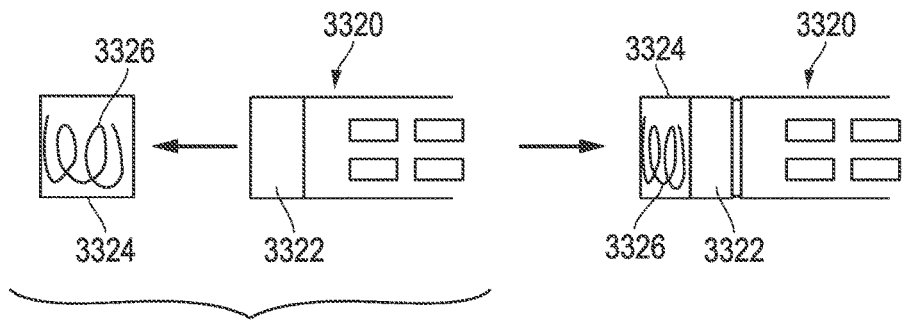
FIGS. 33A-33c illustrates a spring loaded end cap.
Figure 33B:
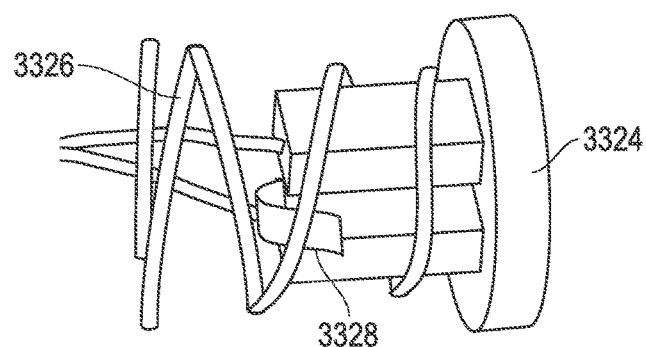
Figure 33C:
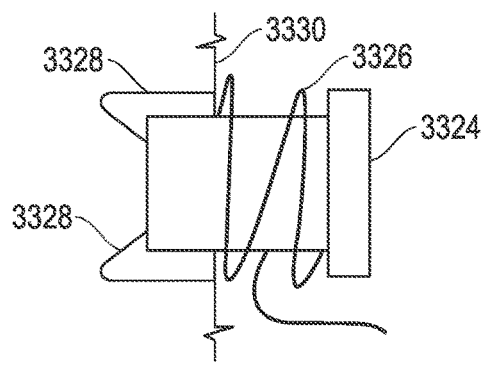

FIG. 36 describes an embodiment of the invention that replaces fluorescent bulbs in fluorescent fixtures with lighting using a spring loaded device installed in the fluorescent fixtures, as seen in FIGS. 33A and 33B. In step 3600, a spring 3326 is installed on the fixture 3324. In optional step 3602, if needed, the fixture 3324 is mounted to the lamp cabinet. The fixture 3324 and/or the spring 3326 can be attached to the lamp cabinet with an adhesive, such as glue, tape, epoxy, or a similar compound. In optional step 3604, a material is optionally cut to length to form a tube or a suitable tube is chosen for a specific application and in step 3606, LEDs are attached to the tube. In step 3608, the tube 3320 with the attached LEDs is inserted into the fluorescent fixture. The spring 3326 compresses and, thus, holds the tube 3320 with the attached LEDs in place. In step 3610, the LEDs are connected to a LED driver or power supply. In FIG. 33A, the spring is mounted inside the fixture and the tube In some embodiments, the spring is mounted on the fixture positioned between a portion of the fixture and a wall of the lamp cabinet or other fixture holder and shown in FIGS. 33B and 33C. In this case, the spring pushes the fixture away from the wall. In other embodiments, such as shown in FIG. 33A, the fixture is fixed with respect to the wall and the spring pushes on the tube, directly or indirectly through an intermediary element. FIG. 33C shows a fixture 3324 that is prevented from coming completely out of the lamp cabinet by a clip 3328 or other device that catches behind a wall 3330 of a lamp cabinet, and the spring 3326 biases the fixture away from the cabinet wall. In other embodiments, the spring is glued or otherwise attached to both the cabinet and to the fixture, for example, on the rear of the flange, to attach the fixture-spring assembly to the cabinet. In some embodiments, the spring is mounted inside the fixture so that the tube directly touches the spring. In some embodiments, springs are mounted in two fixtures to hold the tube in place. In some embodiments, only one fixture is mounted with a spring to hold the tube in place.

FIG. 34 shows a fixture 3414 that includes a base portion 3410 and a receptacle portion 3408 that is biased by a spring 3412 away from the bottom of the base. Receptacle 3408 is cylindrical. An endcap 3406 is supported on the end of receptacle portion 3408 and a tube 3402 is inserted into the end cap. The tube 3402 includes LED lights 3404 powered by a Power Supply/driver 3420. Alternatively, the end cap 3406 can be designed to extend into base portion 3410 to support the tube. The other end (not shown) of tube 3402, which may have an adapter end cap attached, is inserted into a second fixture, which does not require a spring. The end caps hold the tube in position.

The tube used with any embodiment can be standard plastic or metal tubing of any shape. These shapes include cylindrical, triangle-shaped, square-shaped, and hexagonal-shaped. A kit in accordance some embodiments of the invention can include springs, LEDs with a means for attaching to the material that can be cut to length, and a power supply for the LEDs. The LEDs can be attached to the cut to length material using adhesives or mechanical fasteners.

FIG. 35 shows a kit that includes a fluorescent fixture 3502, an LED carrier tube 3506 that supports LEDs 3504, and a spring 3510. LED carrier tube 3506 can be broken off or cut to any length. Multiple carrier tubes 3506 can be connected together to form a longer chain of LEDs. The maximum number of LEDs is determined by a power supply/driver 3508. Tube material that can be cut to a specific length is optionally supplied with a kit, although this material is readily available and found, for example, in most commercial sign shops. The material can be a conductor or an insulator.

The spring is designed to slip over the fluorescent fixture and stay in place unless the spring is directly pulled off. This facilitates connecting the spring to the fixture in the field rather than requiring the spring to be attached to the fixture in a factory. The fixture 3502 may include a clip to as shown in FIG. 33B or 33C to keep the spring from pushing it out of the cabinet wall. In some embodiments, the spring may be attached to the wall and to the fixture by an adhesive or a mechanical clip. In other embodiments of the kit, the fixture may include an internal spring, as shown in FIGS. 33A or 34. Any combinations or configuration described above, as well as other configurations, can be included in the kit.

Although the present invention and its advantages have been described in detail, it should be understood that various changes, substitutions and alterations can be made to the embodiments described herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A method of providing light emitting diode (LED) lighting in a fluorescent lamp cabinet, the method comprising:
    cutting tubing to a predetermined length to create a tube;
    fitting non-conductive end caps to each end of the tube without a screw or other connectors;
    attaching at least one LED to the tube;
    mounting the tube into a fluorescent lamp cabinet, the tube being supported by the end caps attached directly or indirectly to the cabinet; and
    connecting a source of electrical power to the LED, the electrical power not being provided through either of the end caps.

2. The method of claim 1 in which mounting the tube into the fluorescent lamp cabinet comprises supporting at least one of the end caps by a fluorescent lamp mounting fixture mounted to the fluorescent lamp cabinet.

3. The method of claim 2 in which supporting at least one of the end caps by a fluorescent lamp mounting fixture comprises inserting a portion of the at least one end cap into the fluorescent lamp mounting fixture.

4. The method of claim 2 in which supporting at least one of the end caps by a fluorescent lamp mounting fixture comprises inserting a portion of the at least one end cap over the fluorescent lamp mounting fixture.

5. The method of claim 1 in which mounting the tube into the fluorescent lamp cabinet comprises inserting a portion of at least one of the end caps directly into a hole in the fluorescent cabinet and not into a fluorescent lamp mounting fixture mounted to the fluorescent lamp cabinet.

6. The method of claim 1 in which mounting the tube into the fluorescent lamp cabinet comprises mounting the tube into fluorescent lamp cabinet of a backlit commercial sign.

7. An end cap for replacing fluorescent tube lights with light emitting diode (LED) lights within a lamp cabinet, comprising:
    a first mating structure, the first mating structure configured to attach to the end of a tube without screws or other connectors; and
    a second mating structure for holding the tube and end cap in place, within a lamp cabinet and configured to fit directly into a hole in the lamp cabinet rather than being configured to fit within a lamp fixture mounted into the lamp cabinet.

8. The end cap of claim 7 in which the first mating structure fits into the tube.

9. The end cap of claim 7 in which the first mating structure slides over the tube.

10. The end cap of claim 7 in which the first mating structure comprises plastic or rubber.

11. The end cap of claim 7 in which the first mating structure mates with a cylindrical, triangle-shaped, square-shaped, or hexagonal-shaped tube.

12. The end cap of claim 7 in which the first mating structure accepts tubes having different cross sections.

13. The end cap of claim 12 in which the first mating structure accepts cut-to-length tubes having different diameters.

14. The end cap of claim 12 in which the first mating structure includes at least one flange for fitting into or over the tube.

15. The end cap of claim 14 in which the flange forms a friction fit with the tube.

16. The end cap of claim 14 in which the flange includes protuberances that maintain a friction fit between the end cap and the tube.

17. The end cap of claim 14 in which the first mating structure includes multiple flanges for fitting into or over tubes of different sizes.

18. The end cap of claim 14 in which the first mating structure includes multiple flanges for fitting into tubes of different sizes and over tubes of different sizes.

19. The end cap of claim 8 in which:
the second mating structure is configured on a first element; and
the first mating structure is configured on a first element slidably connected with the first element;
and further comprising:
a spring biasing the first element away from the second element.

20. A kit for replacing fluorescent tube lights, the kit comprising:
two end caps that attach to ends of a tube;
at least one light emitting diode (LED) that attaches to at least one side of the tube; and
an LED power supply for supplying power to the at least one LED, the power not being supplied through either of the end caps.

21. The kit of claim 20, in which the at least one light emitting diode comprises at least one trimmable light emitting diode strip.

22. The kit of claim 20, in which the tube has a cylindrical, triangle-shaped, square-shaped, or hexagonal-shaped cross-section.

23. A light emitting diode (LED) lamp for replacing fluorescent tube lights, the LED lamp comprising:
a tube similar in length to a fluorescent tube;
two end caps, each end cap disposed at each end of the tube;
at least one LED attached to at least one side of the tube; and
means for connecting the at least one LED to an LED power supply for supplying power to the at least one LED without the power being conducted through the end cap.

24. The LED lamp of claim 23, in which the tube has a cylindrical, triangle-shaped, square-shaped, or hexagonal-shaped cross-section.

\* \* \* \* \*